US012749493B2

(12) United States Patent
Christian

(10) Patent No.: US 12,749,493 B2
(45) Date of Patent: Sep. 29, 2026

(54) METHOD AND SYSTEM FOR METERING AUDIO EXPOSURE FROM A WIRELESS PERSONAL LISTENING DEVICE

(71) Applicant: The Nielsen Company (US), LLC, New York, NY (US)

(72) Inventor: Timothy R. Christian, Tampa (Fl)

(73) Assignee: The Nielsen Company (US), LLC, New York, NY (US)

( * ) Notice: Subject to any disclaimer, the term of this patent is extended or adjusted under 35 U.S.C. 154(b) by 120 days.

(21) Appl. No.: 18/782,872

(22) Filed: Jul. 24, 2024

(65) Prior Publication Data

US 2025/0308539 A1 Oct. 2, 2025

Related U.S. Application Data

(60) Provisional application No. 63/570,934, filed on Mar. 28, 2024.

(51) Int. Cl.
*G10L 19/16* (2013.01)
*G10L 19/008* (2013.01)
*G10L 19/018* (2013.01)

(52) U.S. Cl.
CPC .......... *G10L 19/167* (2013.01); *G10L 19/008* (2013.01); *G10L 19/018* (2013.01)

(58) Field of Classification Search
USPC ........................................ 704/1–504; 455/72
See application file for complete search history.

(56) References Cited

U.S. PATENT DOCUMENTS 8,885,842 B2 * 11/2014 Chen ........................ G01S 3/801 725/18
9,258,607 B2 * 2/2016 Chen ........................ H04R 3/005
(Continued)

FOREIGN PATENT DOCUMENTS

CN 112020136 A * 12/2020 ........... H04R 29/006
CN 112020136 B * 2/2021 ........... H04R 29/006
(Continued)

OTHER PUBLICATIONS

Brad Adgate, "Nielsen to Start Measuring Audio Listening on Headphones," printed from the World Wide Web, https://www.forbes.com/sites/bradadgate/2020/09/10/nielsen-to-start-measuring-audio-listening-on-headphones/?sh=6f4d0b305338, dated Sep. 10, 2020.

(Continued)

*Primary Examiner* — Marcus T Riley
(74) *Attorney, Agent, or Firm* — McDonnell Boehnen Hulbert & Berghoff LLP

(57) ABSTRACT

A system for metering of audio exposure from a wireless personal listening device (WPLD) includes (i) the WPLD, configured to be worn by a person, to wirelessly receive an audio stream defining audio, and to play out audio of the received audio stream in real time to one or both ears of the person and (ii) a charging device configured to be coupled with the WPLD when the WPLD is not worn and configured to deliver energy to the WPLD to charge an energy supply of the WPLD. The system includes a processor in the WPLD or charging device, configured to establish audio signature data representing the audio played out by the WPLD. And the system is configured to respond to coupling of the WPLD with the charging device by at least reporting the established audio signature data to an external computing system for use to facilitate measuring media exposure.

20 Claims, 9 Drawing Sheets

(56) References Cited

U.S. PATENT DOCUMENTS

| | | | | | |
|---|---|---|---|---|---|
| 9,332,363 | B2 * | 5/2016 | Jain | | H04R 29/00 |
| 9,351,658 | B2 * | 5/2016 | Lee | | A61B 5/0006 |
| 10,506,941 | B2 * | 12/2019 | Lee | | A61B 5/0006 |
| 11,910,147 | B2 * | 2/2024 | Lehnert | | H04R 1/1025 |
| 2014/0067680 | A1 * | 3/2014 | Turner | | G06Q 20/425 705/44 |
| 2016/0256065 | A1 * | 9/2016 | Lee | | A61B 5/0006 |
| 2017/0116400 | A1 * | 4/2017 | Takacs | | G06F 21/44 |
| 2020/0187810 | A1 * | 6/2020 | Lee | | A61B 5/0006 |
| 2021/0224371 | A1 * | 7/2021 | Boesen | | G06F 21/32 |
| 2022/0116730 | A1 | 4/2022 | Tong et al. | | |
| 2022/0286792 | A1 * | 9/2022 | Burwinkel | | H04R 25/554 |
| 2023/0224622 | A1 * | 7/2023 | Lehnert | | H04R 1/1025 381/74 |
| 2025/0094550 | A1 * | 3/2025 | Gelsey | | B60L 53/65 |
| 2025/0308539 | A1 * | 10/2025 | Christian | | G10L 19/167 |

FOREIGN PATENT DOCUMENTS

| | | | | |
|---|---|---|---|---|
| CN | 217546294 | | 10/2022 | |
| DE | 102019108891 | A1 * | 10/2020 | H04L 9/0643 |
| EP | 2531368 | B1 * | 4/2019 | B60L 53/65 |
| EP | 3718814 | A1 * | 10/2020 | H04L 9/3231 |
| EP | 3770008 | A1 * | 1/2021 | B60L 53/64 |
| EP | 4625996 | A1 * | 10/2025 | G10L 19/018 |
| ES | 2733132 | T3 * | 11/2019 | H04L 9/3247 |
| FR | 3076653 | | 7/2019 | |
| FR | 3076653 | A1 * | 7/2019 | H04H 60/58 |
| WO | 2007/056624 | | 5/2007 | |
| WO | WO-2021013881 | A1 * | 1/2021 | B60L 53/64 |

OTHER PUBLICATIONS

Christian Ziberg, "How to enable mono audio for your AirPods or other headphones and why you might want to," printed from the World Wide Web, iDownloadBlog.com, dated Oct. 12, 2023.

Apple Support, "Charge your AirPods and learn about battery life," printed from the World Wide Web, htpps://support.apple.com/en-us/HT207012#:~:text=With multiple charges in your,24 hours of talk time.&text=Your AirPods Pro (2nd generation, time,o . . . , printed on Feb. 12, 2024.

* cited by examiner

METHOD AND SYSTEM FOR METERING AUDIO EXPOSURE FROM A WIRELESS PERSONAL LISTENING DEVICE

REFERENCE TO RELATED APPLICATION

This application claims priority to U.S. Provisional Patent Application No. 63/570,934, filed Mar. 28, 2024, the entirety of which is hereby incorporated by reference.

BACKGROUND

In order to measure the extent to which people of various demographics are exposed to media content presented by media-presentation devices such as televisions, computers, tablets, phones, gaming devices, smart speakers, or other devices, a media-monitoring company can arrange to have media-monitoring devices, or "meters," monitor media presentation in representative households or other sites. People who have their media exposure monitored may be considered "panelists," and the places where the monitoring occurs, such as homes, offices, or other premises, may be considered "panelist sites."

SUMMARY

At each of various panelist sites having a media-presentation device, the media-monitoring company may arrange for a meter to monitor media presentation by that device and to generate query signature data representing the presented media. Further, the media-monitoring company may also operate a computing system, such as a cloud-based computing system, to receive and evaluate this meter-generated query signature data, in order to identify the media presented at the panelist site and thereby to establish associated media-exposure data.

For instance, by evaluating an audio line feed into the media-presentation device and/or by evaluating associated acoustic speaker output, a representative meter at a panelist site may be configured to detect and extract watermarked identification codes from the audio and/or to generate digital audio fingerprint data representing the audio, and to report the identification codes and/or fingerprint data, along with associated timestamps, as query signature data to the computing system for analysis. Such a meter may also be configured to detect the power on or off state of the media-presentation device, so that the meter can limit its media-presentation monitoring to times when the media-presentation device is on and therefore likely presenting media content being delivered to the media-presentation device.

The computing system operated by the media-monitoring company may then be configured to refer to reference signature data that maps various identification codes and/or fingerprint data to known media content items, in order to determine, based on the meter-reported identification codes and/or fingerprint data, what media content the media-presentation device was presenting at the indicated time. In particular, the computing system may be configured to search through the reference signature data in an effort to find reference signature data that matches the reported query signature data and, upon finding a match with sufficient certainty, to conclude that media represented by the query signature data is the media associated with the matching reference signature data, and to establish associated media-presentation records for the panelist site.

Further, the computing system may be configured to correlate these media-presentation records with pre-stored demographics of the panelist or panelist site at issue, in order to establish associated media-exposure data, and the computing system may be configured to use this media-exposure data from multiple panelist sites as a basis to establish ratings statistics that may facilitate commercial processes such as ad placement and other content delivery.

One type of media-presentation device that poses a technical challenge for media-exposure monitoring is a wireless personal listening device (WPLD). Examples of WPLDs include, without limitation, earbuds (e.g., earphones or canalphones), headphones, and augmented or virtual reality headsets. WPLDs are typically designed to be worn directly over or in a user's ear(s) and to receive audio transmitted wirelessly from an audio source and play the received audio directly into the user's ear(s). Other types of WPLDs, including single-ear devices, implants, and bone-conduction headphones, are possible as well.

A technical problem with monitoring audio presentation by a WPLD is that a meter device would have no way to observe the presented audio. For instance, there would be no way for a meter device to monitor an audio line feed to the WPLD, since the feed to the WPLD is wireless, with the wireless transmission likely encrypted. Further, there would be no way for a meter device to monitor acoustic speaker output from the WPLD, since the audio output from the WPLD may be directly into the user's ear(s) rather than generally into the user's environment where the meter may operate. Generally the only workable approach may be to have users of WPLDs manually log their listening in a diary; but that is impractical.

Considering the growing market for WPLDs, the present disclosure provides a new method and system for metering audio exposure from a WPLD. In accordance with the disclosure, the new meter system will operate cooperatively within the WPLD and a charging device with which the WPLD would be connected for charging when not in use. As the WPLD presents audio to a user, a processor within the WPLD will record key data regarding audio presented by the WPLD. Then when the WPLD gets connected with the charging device, the WPLD and/or charging device may receive and operate on the data and output the results from the charging device for transmission to a local or cloud-based computing system for use as a basis to establish ratings statistics or for other purposes.

Example implementations of this new meter system could include the WPLD and/or charging device being configured to establish query signatures representing the audio presented by the WPLD, and the charging device providing those query signatures along with possibly associated sensor data to the computing system.

In some implementations, for instance, the WPLD itself could be configured to establish (e.g., extract or generate) audio signatures from the audio and to store the established audio signatures in data storage of the WPLD, and the WPLD and/or charging device could be configured to retrieve the stored audio signatures from the WPLD's data storage and report the retrieved audio signatures from the charging device to the computing system. In other implementations, the WPLD could be configured to store digital samples of the audio, and the charging device could be configured to establish audio signatures from those stored digital samples and to report the audio signatures to the computing system.

Further, the WPLD could include one or more sensors that the WPLD could use to determine operational state of the WPLD (e.g., motion state, ambient light state, in/on-ear state, etc.) in time correlation with the established audio signatures or digital samples, and the WPLD, charging device, and/or computing system could use that determined operational state as a basis to control the establishing, reporting, and/or use of the audio signature data.

Accordingly, in one respect, disclosed is an example meter system. The meter system includes a WPLD configured (i) to be worn by a person, (ii) to wirelessly receive an audio stream defining audio, and (iii) to play out audio of the received audio stream in real time to one or both ears of the person. Further, the meter system includes a charging device configured to be coupled with the WPLD when the WPLD is not worn and configured to deliver energy to the WPLD to charge an energy supply of the WPLD. And the meter system includes a processor in the WPLD or charging device, configured to establish audio signature data representing the audio played out by the WPLD. Still further, the meter system is configured to respond to coupling of the WPLD with the charging device by at least reporting the established audio signature data to an external computing system for use to facilitate measuring media exposure.

In example implementations, the received audio stream is a digital audio stream, and the WPLD is configured to transform the digital audio stream, including filtering a frequency bandwidth of the digital audio stream, downsampling the digital audio stream, and reducing a bit-length of samples of the digital audio stream. The establishing of the audio signature data could then be based on the transformed digital audio stream.

In another respect, disclosed is an example method to facilitate measuring media exposure. The method includes wirelessly receiving, by a WPLD that is configured to be worn by a person, an audio stream defining audio. Further, the method includes the WPLD playing audio of the received audio stream in real time to one or both ears of the person. In addition, the method includes establishing, by the WPLD or by a charging device with which the WPLD is configured to be coupled when the WPLD is not worn, audio signature data representing the audio played out by the WPLD. And the method includes, responsive to at least a detection of a connection between the WPLD and the charging device, reporting to an external computing system the established audio signature data for use to facilitate measuring media exposure.

These, as well as other embodiments, aspects, advantages, and alternatives, will become apparent to those of ordinary skill in the art by reading the following detailed description, with reference where appropriate to the accompanying drawings. Further, it should be understood that the disclosure provided in this summary elsewhere in this document is provided by way of example only and that numerous variations and other examples may be possible as well.

DETAILED DESCRIPTION

Figure 1A:
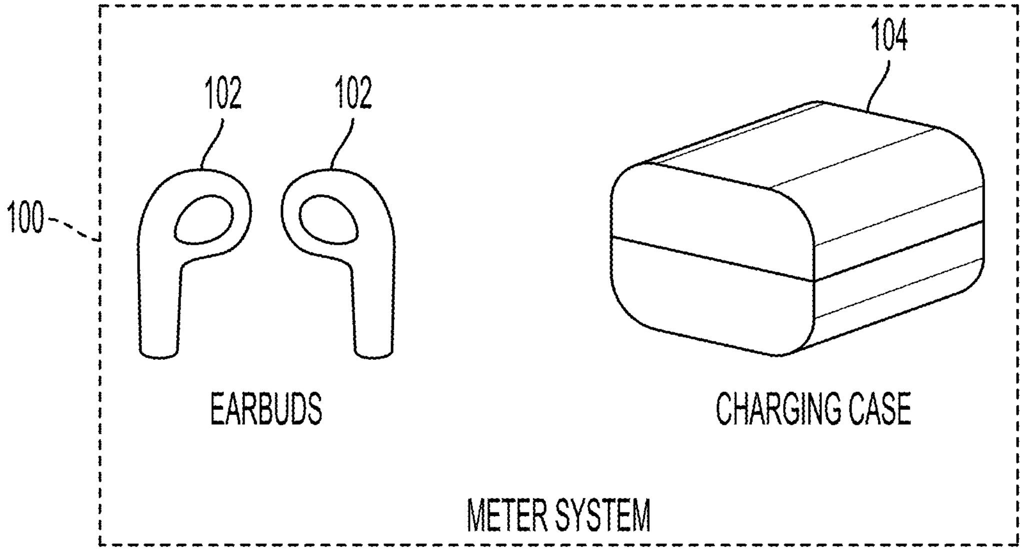
FIG. 1A is a simplified illustration of an example meter system including earbuds and a charging case.

The present disclosure will discuss example implementations in the context of a WPLD being a wireless audio device wearable by a user and a charging device being a charging case or charging cradle for the WPLD, and further using BLUETOOTH® as an example wireless audio communication protocol. It will be understood, however, that the principles disclosed could apply as well in any of a variety of other contexts, such as where the WPLD is another type of audio device or personal listening device, where the charging device is a device other than a case or cradle, and where wireless audio communication with the WPLD occurs in accordance with a protocol other than BLUETOOTH®.

More generally, it will be understood that arrangements and processes disclosed herein could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

1. Overview

As noted above, the present disclosure provides a method and system for metering audio exposure from a WPLD, i.e., metering the extent to which a person is exposed to audio played out by a WPLD. In line with the discussion above, an example meter system comprises the WPLD and an associated charging device.

An example WPLD is configured to be worn by a user, perhaps as an in-ear or on-ear listening device, to wirelessly receive a digital audio stream, and to render the audio stream for playout directly into the user's ear(s). To facilitate this, the example WPLD could include (i) a wireless communication module that operates according to a defined protocol (such as BLUETOOTH® Low Energy (BLE) for instance) to receive a digital audio stream from an audio source, (ii) data storage such as flash memory for storing audio sample data, (iii) a digital signal processor (DSP) for processing the digital audio stream, (iv) a digital to analog converter for translating the digital audio stream to an analog audio stream, and (v) one or more sound speakers for outputting the resulting audio for receipt by the user's ear(s). Further, the example WPLD could include one or more batteries or other energy sources for driving operations of the WPLD. And the example WPLD could include one or more sensors, such as an accelerometer, a light detector, and a global navigation satellite system (GNSS) receiver, which may function to sense operational state of the WPLD.

An example charging device is then configured to be coupled with the WPLD to facilitate charging the battery or other energy source(s) of the WPLD, perhaps when the WPLD is not being worn by a user. The charging device and WPLD could each be structured to allow this coupling, through a direct electrical connection, electromagnetic connection (e.g., inductive coupling), or other mechanism. For instance, the charging device could comprise a cradle, case, dock, or other structure on, at, or in which the WPLD could be situated when not in use, and/or the charging device could be configured to connect a power supply to the WPLD through an electrical cable connection. The charging device itself may also be battery powered, and may work to transfer energy from its battery to the battery of the WPLD upon connection with the WPLD. Alternatively, the charging device could otherwise be configured to supply energy to the WPLD.

The WPLD and charging device may be configured with processing logic to carry out the present metering operations. For instance, the WPLD and charging device may each include a processor (e.g., a microprocessor, or DSP), non-transitory data storage, and program instructions stored in the non-transitory data storage and executable by the processor to carry out associated operations. In the WPLD, for example, the same DSP that processes audio for presentation may be configured to additionally carry out certain metering operations, or the WPLD could include a supplemental DSP for this purpose. Further, in the charging device, a DSP or other processor could be configured to carry out various metering operations, among other functions.

Further, the WPLD and charging device could be configured to exchange data with each other, to facilitate various metering operations, such as transfer of audio signatures, digital samples, and/or sensor data from the WPLD to the charging device. For instance, the WPLD and charging device could be configured to exchange data through their charging connection, with data modulated on a radio frequency signal carried through that connection, among other possibilities.

Still further, the WPLD and/or the charging device could be configured with a network communication interface, such as a wireless communication interface (e.g., BLUETOOTH®, WI-FI, ZIGBEE, or cellular communication interface) through which to report metering data for ultimate receipt by an external computing system such as a (i) a local collector device (e.g., laptop, tablet, smartphone, or smartwatch), which may be configured to collet metering data and to transmit the metering data to a cloud-based computing system for evaluation and/or (ii) a cloud-based computing system. In an example implementation, for instance, the WPLD and/or charging device may be pre-provisioned with data indicating a network address of the computing system as a destination for the metering data. Thus, provided with metering data to report, the WPLD and/or charging device could transmit the metering data to the computing system at that pre-provisioned network address.

As discussed above, the meter system comprising the WPLD and charging device could be configured to establish audio signatures representing audio presented by the WPLD and to send the established audio signatures, possibly with associated sensor data, as a meter report to the computing system, for use by the computing system to establish ratings statistics or for other purposes. Optimally, the WPLD could collect metering data (e.g., digital audio samples and/or the audio signatures) while the WPLD is in use playing audio into a person's ear(s), and the WPLD and/or charging device will then make use of that collected metering data as a basis to generate and output a meter report for receipt by the computing system.

Implementation details could take various forms. In a first example implementation, for instance, the WPLD itself could be configured to establish and store audio signatures of the audio as it plays the audio into the user's ear(s), and the charging device could be configured to obtain these audio signatures, and possibly associated sensor data, upon charging connection of the WPLD with the charging device, and to generate and send a meter report to the computing system. Whereas, in a second example implementation, the WPLD could be configured to establish and store digital samples of the audio as it plays the audio into the user's ear(s), and the charging device could be configured to obtain these digital samples, and possibly associated sensor data, upon charging connection of the WPLD with the charging device, and to generate and send a meter report to the computing system.

Variations on these implementations are possible as well. For instance, in one variation, the WPLD may store digital samples of the audio that it plays out and then, upon charging connection with the charging device, may establish the audio signatures based on these stored digital samples, and the charging device may then report the audio signatures to the computing system. Further, in another variation, the WPLD may be more substantively involved in outputting the meter report for transmission to the computing system. For instance, the WPLD, rather than or in addition to the charging device, may include a communication interface through which to send the meter report, with the meter report and/or transmission established upon connection of the WPLD with the charging device. Alternatively, the WPLD may report the audio signature data through the charging device to the computing system.

The process of establishing audio signatures of the audio played out by the WPLD, whether carried out by the WPLD and/or the charging device, can take various forms. Without limitation, the audio signatures could comprise unique codes watermarked in the audio, in which case the process of establishing the audio signatures could comprise detecting the watermarks in the audio, decoding the detected watermarks to extract the unique codes, and recording the extracted codes along with timestamps indicating time of playout of the associated audio. Alternatively, the audio signatures could comprise digital fingerprints representing unique characteristics, such as spectral characteristics, of the audio, in which case the process of establishing audio signatures could comprise evaluating the audio to determine its unique characteristics, and generating and recording the digital fingerprints along with associated timestamps.

In the first example implementation, as the WPLD processes digital audio for playout, the WPLD could establish audio signatures representing the audio being processed and could store the established audio signatures in data storage of the WPLD, for later reporting to the computing system upon charging connection of the WPLD and charging device.

In practice, the WPLD could also transform a data representation of the audio to help facilitate or improve efficiency of generating audio signatures.

For instance, as the WPLD processes a digital audio stream to facilitate playout of the audio into the user's ear(s), the WPLD could down-sample a copy of the audio stream before establishing the audio signature data, to help minimize the processing burden that will be involved with the WPLD or charging device establishing audio signatures representing the audio (based on the copy). For instance, if the audio stream is originally sampled at 48 kilohertz (kHz), i.e., 48,000 samples per second, the WPLD may down-sample the audio to, say 8 kHz, by keeping just every sixth sample. Down-sampling the audio stream would reduce the number of samples per unit time, which may help reduce the number of processor cycles that would be used to establish the audio signatures, and reducing the number of processor cycles that would be used to establish the audio signatures may help conserve the WPLD's battery energy.

Further, if the WPLD is going to down-sample the audio, the WPLD may also need to filter the audio signal in the frequency domain, to help ensure that the sampling rate remains sufficient to represent the audio according to the Nyquist theorem. For instance, the audio as sampled may span a frequency range that is about 20 kHz wide. Optimally, the WPLD may be able to narrow this frequency range of the audio while still preserving the ability to establish audio signatures (e.g., to extract watermark codes and/or to generate digital fingerprints), since it may be possible to establish audio signatures from as little as a 4 kHz frequency range of the audio. Thus, before the WPLD down-samples the audio to an 8 kHz sampling rate, the WPLD could first filter the audio, e.g., by applying a bandpass filter, e.g., an Infinite Impulse Response (IIR) filter or Finite Impulse Response (FIR) filter, to produce a 4 kHz wide representation of the audio. Then the WPLD could down-sample the 4 kHz wide audio signal to an 8 kHz sampling rate. The WPLD may then use this filtered and down-sampled audio stream to establish the audio signature data.

Still further, the WPLD could additionally limit the processing burden involved with establishing the audio signatures, and/or could limit the storage burden involved with the process, by stripping off the least significant bits of each digital sample before establishing the audio signature data. For instance, if the digital samples are each 20 bits, the WPLD may strip off the least significant 4 bits of each sample, to reduce the amount of data that would need to be evaluated. Samples of 16 bits may still carry enough information to facilitate establishing audio signatures for present purposes.

As the WPLD thus down-samples and/or otherwise limits the extent of data representing the audio played out by the WPLD, the WPLD may establish and record audio signatures with associated timestamps. Then once the WPLD gets connected with the charging device, the charging device may retrieve the WLPD-recorded audio signatures and timestamps and report to the computing system for evaluation.

In the second example implementation, the charging device, rather than the WPLD, establishes the audio signatures representing the audio that was played out by the WPLD. In particular, the WPLD could record digital samples of the audio played by the WPLD, and, upon connection of the WLPD with the charging device, the charging device could then retrieve those recorded digital samples, establish the audio signatures based on the retrieved digital samples, and report the audio signatures to the computing system for evaluation.

In this implementation, the WPLD may transform the audio data as described above (e.g., filtering, down-sampling, and stripping off least significant bits before establishing the audio signature data), to help limit the amount of data that the WPLD would store (and thus the amount of storage space needed to store that data) for later retrieval by the charging device. Upon connection of the WPLD with the charging device, a processor in the charging device may then establish the audio signatures based on that transformed data and may report the established audio signatures to the computing system. In this implementation, the WPLD may timestamp the recorded samples of the audio, so that the charging device can correspondingly timestamp the audio signatures established based on those samples.

As noted above, the WPLD may also apply one or more sensors to generate operational data regarding the WPLD, which the present meter system may then use in relation to the metering process. Example sensors may facilitate determining when the WPLD is being worn by a user. For instance, an accelerometer in the WPLD may detect when the WPLD is in motion, which may suggest that the WPLD is in use. Further, an optical sensor in the WPLD may detect when the WPLD is worn by a user, e.g., in or on the user's ear(s). Other types of sensors and operational data may be possible as well.

These sensors may output associated sensor data, which the WPLD could timestamp, and a processor may use this timestamped sensor data in the present metering process to help improve efficiency. By way of example, a processor in the WPLD may use this timestamped sensor data as a basis to control when to establish and record audio signatures and/or to transformed audio data as noted above, possibly limiting its establishing and recording of audio signatures and/or transformed data to times when the WPLD is in motion and/or being worn, or to timestamped data associated with times when the WPLD was in motion and/or being worn. As another example, a processor in the charging device may use this timestamped sensor data as a basis to control when to establish and/or report audio signatures, possibly limiting its establishing and/or reporting of audio signatures to metering data recorded by the WPLD at times when the WPLD was in motion and/or being worn. And as still another example, the charging device may include the timestamped sensor data in its meter reporting to the computing system, and the computing system may use the timestamped sensor data as a basis to control what audio signature data the computing system will evaluate, possibly limiting its analysis to audio signature data from times when the WPLD was in motion and/or being worn.

2. Example Architecture and Operations

Figure 1B:
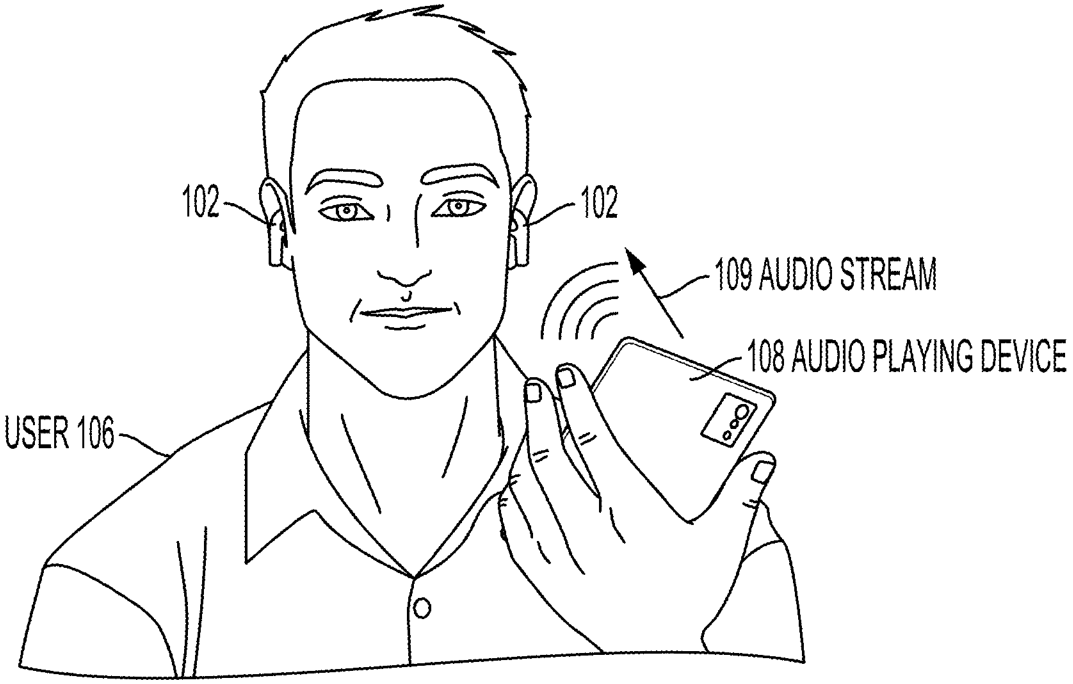
FIG. 1B is a simplified illustration of a user wearing the earbuds, and the earbuds receiving an audio stream that the earbuds play out for the user to hear.
Figure 1C:
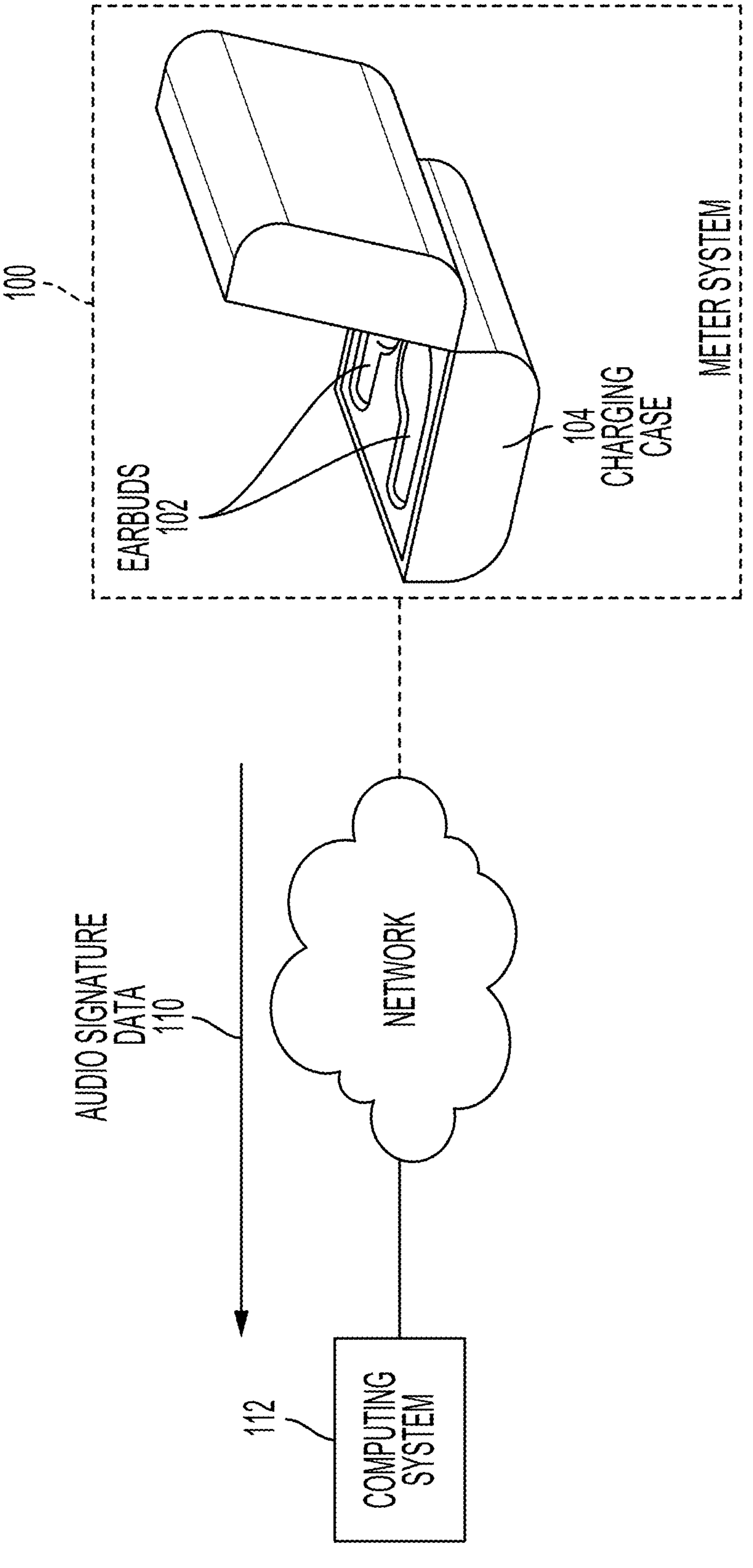
FIG. 1C is simplified illustration of the earbuds being situated in the charging case after playing out the audio for the user to hear, and of audio signature data representing the audio played by the earbuds being reported from the meter system to a computing system.

Referring to the drawings, FIGS. 1A, 1B, and 1C illustrate various aspects of an example meter system 100 comprising a WPLD and a charging device.

As shown in FIG. 1A, in the example meter system 100, the WPLD is a pair of earbuds 102, which may be configured to be worn by a user in or at the user's ears and to wirelessly receive and play out audio for the user to hear, and the charging device is a charging case 104, which may be configured to house and charge the earbuds 102 when the earbuds 102 are not worn/used. Other example meter-system arrangements are possible as well. For instance, other implementations may involve a single earbud or other WPLD and/or a charging device other than a case.

FIG. 1B illustrates a scenario where a user 106 is wearing the earbuds 102 of the meter system 100 in or at the user's ears. Further, FIG. 1B shows an audio player device 108, such as a smartphone, wirelessly transmitting an audio stream 109 to the earbuds 102, which earbuds 102 may be playing out in real time for the user 106 to hear.

In line with the discussion above, while the earbuds 102 are receiving and playing out this audio for the user 106 to hear, the earbuds 102 may record (e.g., in data storage of the earbuds 102) information regarding the audio, to facilitate media-exposure monitoring. For instance, the earbuds 102 may establish and record audio signature data representing the audio that the earbuds 102 are playing. Alternatively or additionally, the earbuds 102 may record digital samples of the audio being played. Further, the earbuds 102 may record associated information such as timestamp data indicating time of playout of associated audio, and sensor data indicating operational state of the earbuds 102 when playing out the associated audio.

FIG. 1C next illustrates a scenario where the earbuds 102 of the meter system 100 are situated in the charging case 104 of the meter system 100. For instance, after listening to audio that the earbuds 102 receive and play out for the user 106 to hear, the user 106 may remove the earbuds 102 from the user's ears and place the earbuds 102 in the charging case 104 for storage and charging.

FIG. 1C further shows that, when the earbuds 102 are situated in the charging case 104, audio signature data 110 representing the audio played out by the earbuds 102 gets transmitted from the meter system 100 to an external computing system 112, such as to cloud-based computing system operated by a media-monitoring company. As discussed above, this may enable the media-monitoring company to measure an extent to which the user 106 was exposed to audio played out by the earbuds 102, namely, to the audio represented by the audio signature data 110, which may in turn facilitate various useful actions.

With this example arrangement, the earbuds 102 of the meter system 100 may establish the audio signature data 110 as the earbuds 102 play out the audio for the user 106 to hear, and the charging case 104 of the meter system 100 may report the established audio signature data 110 to the computing system 112 upon connection of the earbuds 102 with the charging case 104. Alternatively, the earbuds 102 of the meter system 100 may record digital samples of the audio as the earbuds 102 play out the audio for the user 106 to hear, and, upon connection of the earbuds 102 with the charging case 104, the charging case 104 may establish the audio signature data 110 based on the recorded digital samples and may transmit the audio signature data 110 to the external computing system 112.

Other processes may be possible as well. For instance, upon connection of the earbuds 102 with the charging case 104, the earbuds 102 may report the audio signature data 110, possibly via the charging case 104, to the external computing system 112.

Figure 2:
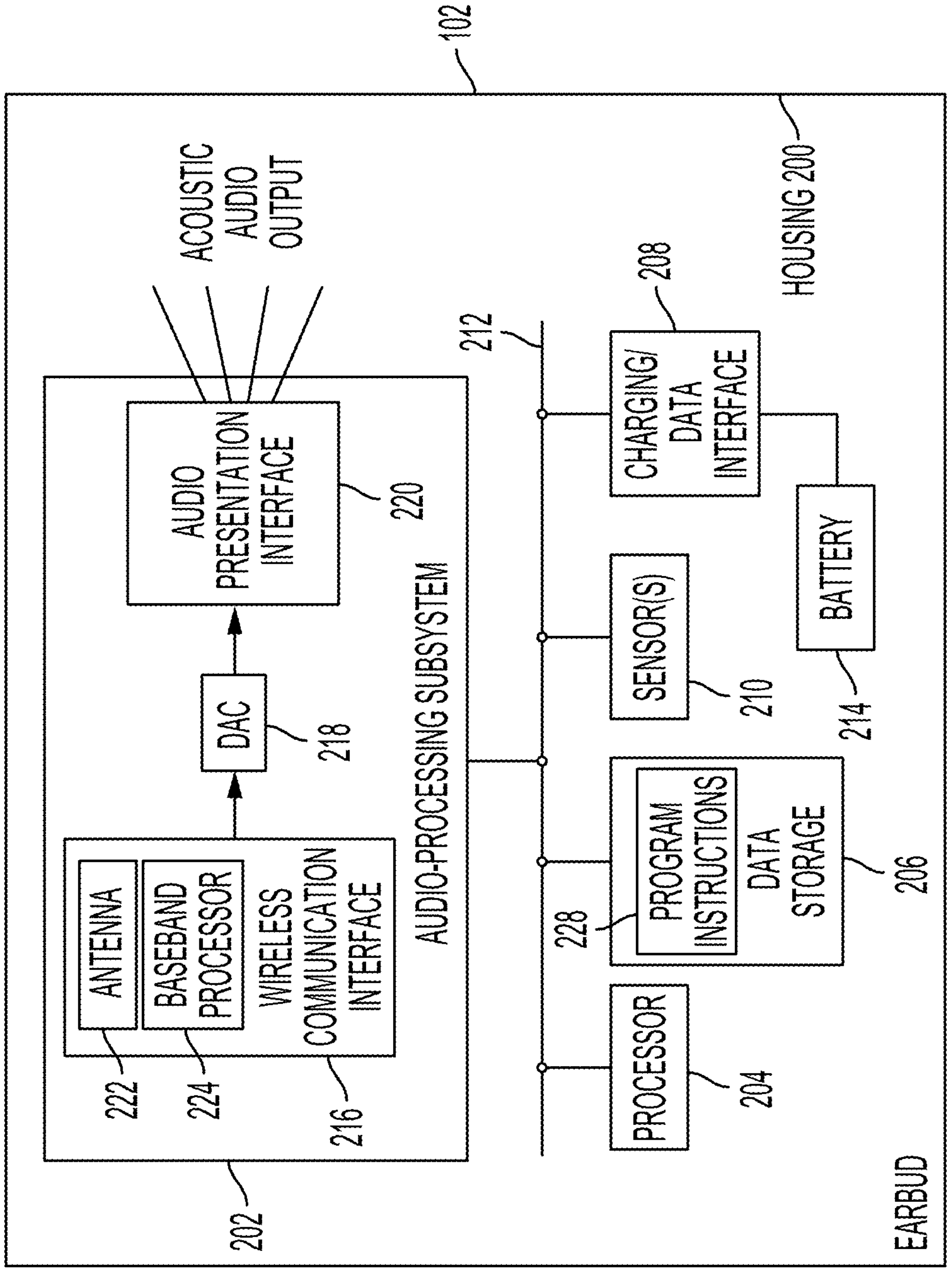
FIG. 2 is a simplified block diagram illustrating components of an example earbud.

FIG. 2 is next a simplified block diagram illustrating example components of an example earbud 102 (e.g., an earbud of the pair of earbuds 102), as an example WPLD of a representative meter system. As shown in FIG. 2, the example earbud 102 includes an earbud housing and/or other outer structure 200, which may be shaped and made of one or more materials such as plastic and silicon so as to allow the earbud 102 to be worn by the user 106 in or at an ear of the user 106. Further, the example earbud 102 includes an audio-processing subsystem 202, a processor 204, non-transitory data storage 206, a charging/data interface 208, and sensors 210, which may be interconnected together by a system bus or other connection mechanism 212. Further, the example earbud 102 also includes a rechargeable battery 214, which could provide energy to drive operation of the various other components of the earbud 102.

The audio-processing subsystem 202 in the earbud 102 serves to receive, process, and play out audio, such as audio transmitted from the audio player device 108. As shown, the audio-processing subsystem includes a wireless communication interface 216, a digital to analog converter (DAC) 218, and an audio-presentation interface 220.

The wireless communication interface 216 in the audio-processing subsystem 202 may comprise one or more modules configured to support wireless communication between the earbud 102 and an audio player device such as device 108. Without limitation, for instance, the wireless communication interface 216 could comprise a BLUETOOTH® interface and particularly a BLUETOOTH® LOW ENERGY (BLE) interface supporting unicast and/or broadcast BLE audio transmission, possibly according to the Basic Audio Profile (BAP) as defined by the Bluetooth Special Interest Group (SIG). As shown, this interface could include an antenna structure 222 configured to receive BLE audio transmission from a transmitting device (e.g., audio player device 108) and baseband processor (e.g., a DSP) 224 configured to demodulate the received BLE audio transmission and to uncover from the transmission a baseband digital audio stream comprising a sequence of digital samples representing a stream of audio to be played out by the earbud 102.

The DAC 218 in turn serves to convert the sequence of digital audio samples to analog form, in order to produce an analog representation of the audio signal to be played out.

The audio-presentation interface 220 may then comprise one or more modules, configured to provide acoustic audio output, such as to acoustically render the analog audio signal output from the DAC 218 and thus the audio that the earbud 102 is receiving from device 108. For instance, as shown, the audio-presentation interface 220 could include one or more miniature sound speakers, such as dynamic drivers and/or balanced armatures, which could be configured to translate from an analog audio signal to acoustic audio output for hearing by the user 106. Further, in some implementations, the audio-presentation interface 220 may itself include the DAC 218, to facilitate more directly translating a received digital audio signal into acoustic audio output.

The processor 204 of the earbud 102 may comprise one or more general purpose processors (e.g., one or more microprocessors, etc.) and/or one or more special-purpose processors (e.g., DSPs, application-specific integrated circuits (ASICs), etc.) Further, the non-transitory data storage 206 may comprise one or more volatile and/or non-volatile storage components (e.g., optical, magnetic, or flash storage, RAM, ROM, EPROM, EEPROM, cache memory, and/or other computer-readable media, etc.), possibly integrated in whole or in part with the processor 204. As shown, the non-transitory data storage 206 may then store program instructions 228, which may be executable by the processor 204 to carry out various WPLD operations described herein. The processor 204 may also include or be interconnected with a clock (not shown) to facilitate timestamping audio signature data, digital sample data, and sensor data.

The charging/data interface 208 may comprise one or more connection modules through which the earbud 102 is configured to exchange both data and power with the charging case 104 when the earbud 102 is connected with, e.g., situated in, the charging case 104. By way of example, the earbud 102 may include one or more physical (e.g., electrical) contacts positioned and configured to connect with one or more corresponding physical contacts in the charging case 104 when the earbud 102 is situated in the charging case 104. Alternatively, the charging/data interface 208 may include a wired connection and/or a wireless (e.g., inductive) connection mechanism.

The charging/data interface 208 may thereby facilitate energy transfer from a battery or other power source of the charging case 104 to the battery 214 of the earbud 102. Further, the charging/data interface 208 may facilitate data exchange between the earbud 102 and the charging case 104, such as transfer from the earbud 102 to the charging case 104 of audio signature data and/or audio data samples recorded by the earbud 102. In some implementations, the charging/data interface 208 may be configured to carry data modulated on power signals. In other implementations, the charging/data interface 208 may be configured to carry data and power separately.

The sensors 210 may comprise one or more sensors configured to monitor and sense operational state of the earbud 102, such as to facilitate recording and/or use of the operational state data in relation to generating, reporting, and/or evaluating audio signature data and/or digital sample data. Examples of these sensors 210 may include microelectronic motion sensors, ambient-light sensors, and touch sensors, among other possibilities, configured to monitor operational state that may indicate whether the earbud 102 is worn by the user 106 and therefore when the user may be exposed to audio being played out by the earbud 102. For instance, one or more such sensors may detect when the earbud 102 is likely worn at the user's ear, rather than being in the user's pocket for example, and may provide associated output signaling. Further, one or more such sensors may detect when the earbud 102 is in motion, which may also help indicate whether the earbud 102 is worn by the user 106, rather than being stored in the charging case 104 or sitting on a desk or other surface for example.

Figure 3:
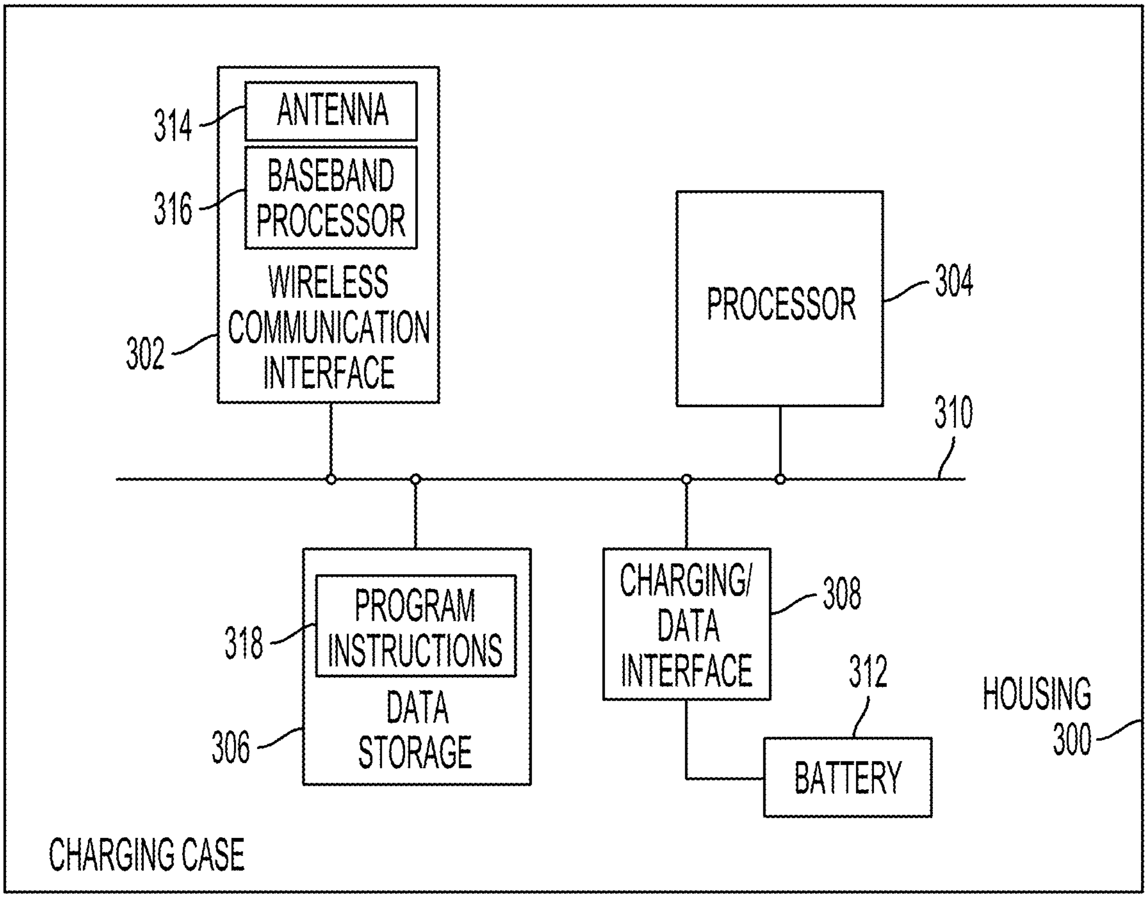
FIG. 3 is a simplified block diagram illustrating components of an example charging case.

FIG. 3 is next a simplified block diagram of an example charging case 104, as an example charging device of a representative meter system. As shown, the example charging case 104 includes a charging case housing or other structure 300, which may be shaped to receive and hold a pair of earbuds including example earbud 102 for storage and charging. Further, the example charging case 104 includes a wireless communication interface 302, a processor 304, non-transitory data storage 306, and a charging/data interface 308, which may be interconnected together by a system bus or other connection mechanism 310.

Further, the example charging case 104 also includes a rechargeable battery 312, which could provide energy to drive operation of the various other components of the charging case 104 and to provide energy for transfer to the earbud 102 to charge the battery 214 of the earbud when the earbud 102 is connected with the charging case 104. Though not shown, the charging case 104 may also include a connection (e.g., a Universal Serial Bus (USB)) or inductive mechanism, through which to charge the battery 312 of the charging case 104.

The wireless communication interface 302 in the charging case 104 may comprise one or more modules for supporting wireless communication between the charging case 104 and a local computing device or local network, in order to facilitate reporting of metering data such as audio signature data to the external computing system 112. Without limitation, for instance, the wireless communication interface 302 may comprise a BLUETOOTH® interface, a WI-FI interface, or other type of wireless data interface, to facilitate short range data communication with a nearby smartphone, tablet, personal computer, or other device, that could define the external computing system 112 or could pass communications along to the external computing system 112. Alternatively or additionally, the wireless communication interface 302 may comprise a wide-area network interface such as a cellular interface, which may similarly enable the charging case 104 to communicate with the external computing system 112. As shown, this wireless communication interface 302 may similarly include an antenna structure 314 and baseband processor 316 to facilitate network communication with the external computing system 112.

The processor 304 may comprise one or more general purpose processors (e.g., one or more microprocessors, etc.) and/or one or more special-purpose processors (e.g., DSPs, ASICs, etc.), possibly including one or more processors of the wireless communication interface 302, among other possibilities. Further, the non-transitory data storage 306 may comprise one or more volatile and/or non-volatile storage components (e.g., optical, magnetic, or flash storage, RAM, ROM, EPROM, EEPROM, cache memory, and/or other computer-readable media, etc.), possibly integrated in whole or in part with the processor 304. As shown, the non-transitory data storage 306 may then store program instructions 318, which may be executable by the processor 304 to carry out various charging-device operations described herein. The processor 304 may also include or be interconnected with a clock (not shown) to facilitate time-stamping audio signature data, digital sample data, and sensor data.

The charging/data interface 308 may comprise one or more connection modules through which the charging case 104 is configured to exchange both data and power with the earbud 102 when the earbud 102 is connected with, e.g., situated in, the charging case 104. By way of example, the charging case 104 may include one or more physical contacts positioned and configured to connect with one or more corresponding physical contacts of the earbud 102 when the earbud 102 is situated in the charging case 104. Alternatively, the charging/data interface 308 may include a wired connection and/or a wireless (e.g., inductive) connection mechanism.

The charging/data interface 308 may thereby facilitate energy transfer from the battery 312 of the charging case 104 to the battery 214 of the earbud 102. Further, the charging/data interface 308 may facilitate data exchange between the earbud 102 and the charging case 104, such as transfer from the earbud 102 to the charging case 104 of audio signature data and/or audio data samples recorded by the earbud 102. In line with the discussion above, in various implementations, the charging/data interface 308 may be configured to carry data modulated on power or may be configured to carry data and power separately.

In line with the discussion above, when the earbud 102 (or a representative pair of such earbuds) is worn by the user 106, the earbud 102 may wirelessly receive the audio stream 109 as a digital audio stream from the audio player device 108 and play out the audio of the stream in real-time for hearing by the user 106. For instance, as noted above, the audio-processing subsystem 202 may receive and demodulate the audio stream to uncover a sequence of digital audio samples, convert the sequence of digital audio samples to an analog audio signal, and play out the analog audio signal as acoustic audio for the user 106 to hear.

Also in line with the discussion above, the example earbud 102 may further be configured to record metering data as to the audio being played out by the earbud 102, and thus as to audio to which the user 106 is exposed, to facilitate reporting to the external computing system 112. For instance, while the earbud 102 is being worn and is playing audio for the user 106 to hear, the processor 204 of the earbud 102 could record this metering data in data storage 206, to facilitate later transfer of the data to and/or through the charging case 104 when the earbud 102 gets connected with the charging case 104.

As discussed above, the metering data that the earbud 102 records may comprise audio signature data that may uniquely represent the audio, to enable the external computing system 12 to determine what audio the user 106 was exposed to. Alternatively or additionally, the metering data that the earbud 102 records may comprise digital audio samples, such as a transformed set of the received digital audio samples for instance. Further, the metering data could include timestamp data indicating time of playout of the audio represented by the audio signature data or by the digital samples, as well as sensor data output by the one or more sensors 210, among other possibilities.

As noted above, the audio signature data could comprise information that uniquely identifies the audio played out by the earbud 102. Without limitation, for example, the audio signature data could comprise identifying information that is steganographically encoded in one or more watermarks in the audio stream itself, in which case the earbud 102 could use any of various techniques to detect the watermarks, extract the identifying information from the watermarks, and record the identifying information as audio signature data, possibly along with timestamp data indicating time of playout of the audio, and sensor information indicating associated operation state of the earbud 102. As another example, the audio signature data could comprise digital fingerprint data that uniquely represents spectral characteristics and/or other properties of the audio, in which case the earbud 102 could use any of various fingerprinting techniques to evaluate one or more properties of the audio and to produce and record these digital fingerprints as audio signature data, also possibly along with timestamp data and sensor data.

The earbud 102 could be configured in various ways to facilitate its establishing and recording of the audio signature data. Without limitation, FIGS. 4-6 show some example arrangements for this process.

Figure 4:
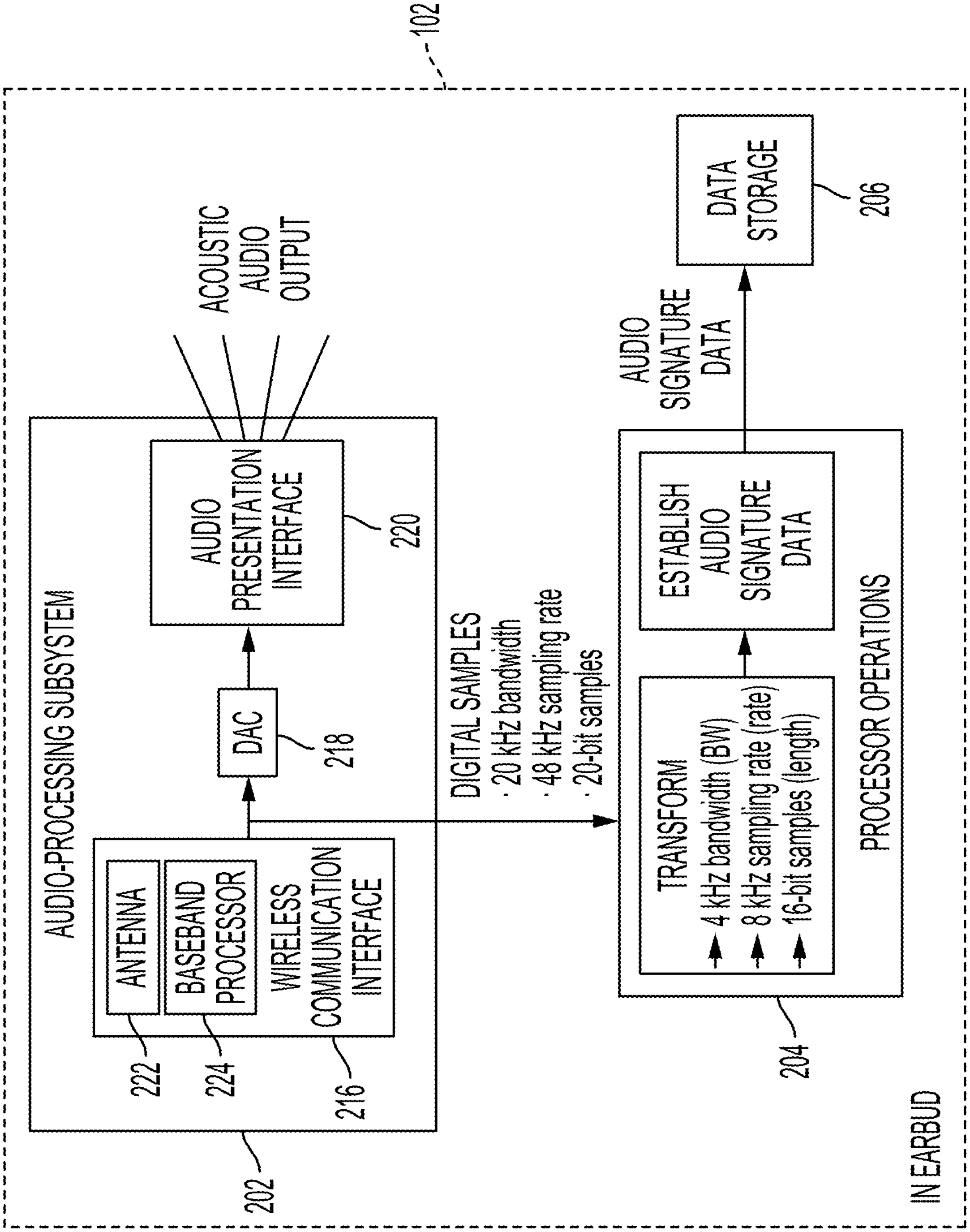
FIG. 4 is a simplified illustration of an arrangement for processing to establish audio signature data representing audio played out by an earbud.

FIG. 4 shows an example arrangement in which the earbud 102 processes a copy of the received digital audio samples to establish the audio signature data and records the established audio signature data in data storage 206 for later reporting when the earbud 102 gets connected with the charging case 104. In particular, as shown in FIG. 4, in parallel with the audio-processing subsystem 202 of the earbud 102 processing and playing out the audio, the audio-processing subsystem 202 also provides a copy of the received digital audio samples to the processor 204, and the processor 204 processes those digital audio samples to establish and record the audio signature data for later reporting.

In the example arrangement shown in FIG. 4, the digital audio samples as provided to the host processor represent audio that spans a frequency range of 20 kHz, and the samples are 20 bits each and have a sampling rate of 48 kHz. As shown, the processor 204 transforms this data by (i) applying a bandpass filter to minimize frequency bandwidth of the audio signal, (ii) stripping the least significant 4 bits from each sample to reduce sample size to 16 bits, and (iii) down-sampling to an 8 kHz sampling rate by keeping every sixth sample. The processor 204 may then evaluate the resulting sequence of digital audio samples to establish the audio signature data, such as extracting watermarked identifying information and/or generating identifying digital fingerprint data. And the processor 204 may store metering data, including this audio signature data possibly along with associated timestamp data and sensor data, in data storage 206 for later reporting to the computing system 112.

Figure 5:
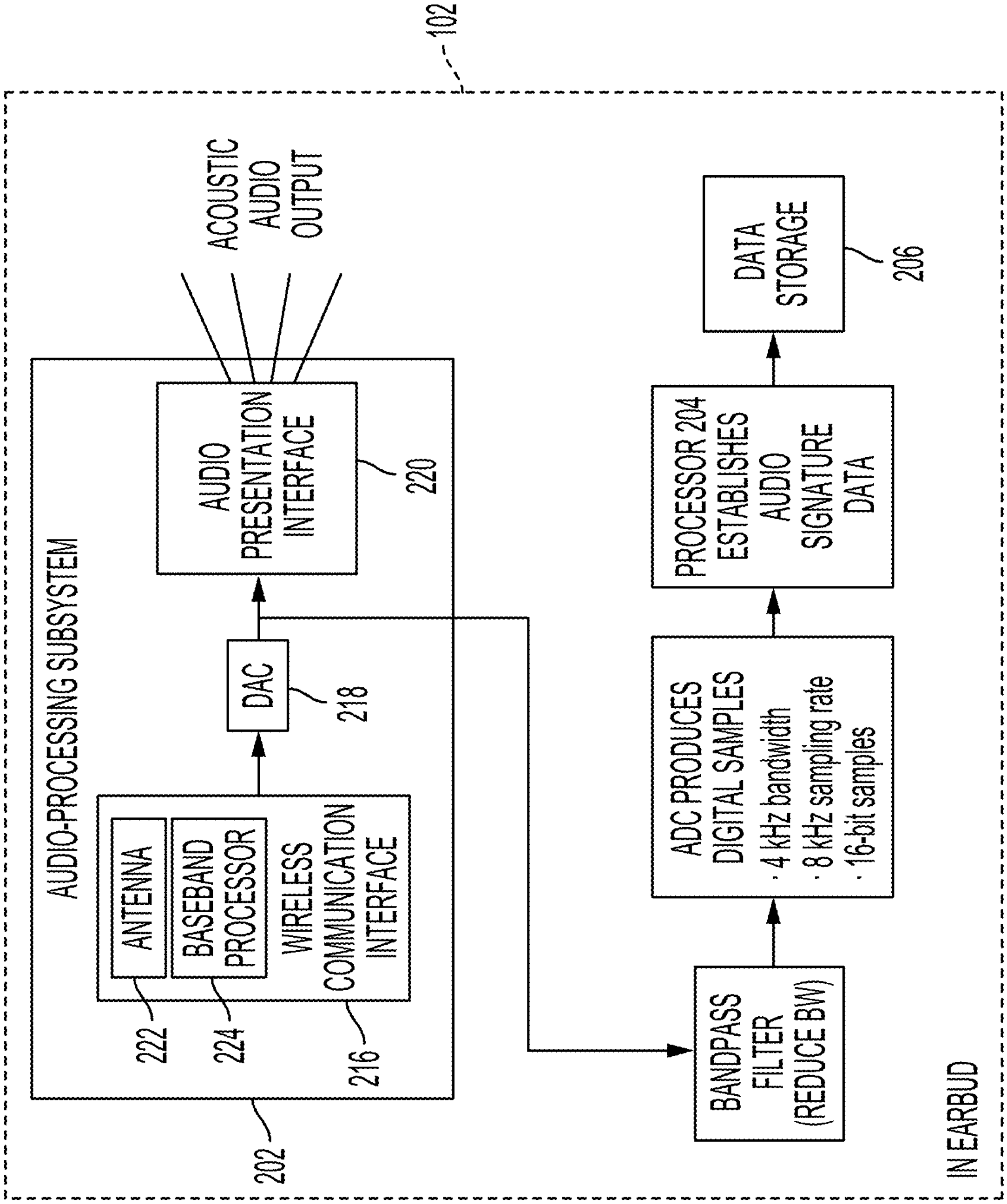
FIG. 5 is another simplified illustration of an arrangement for processing to establish audio signature data representing audio played out by an earbud.
Figure 6:
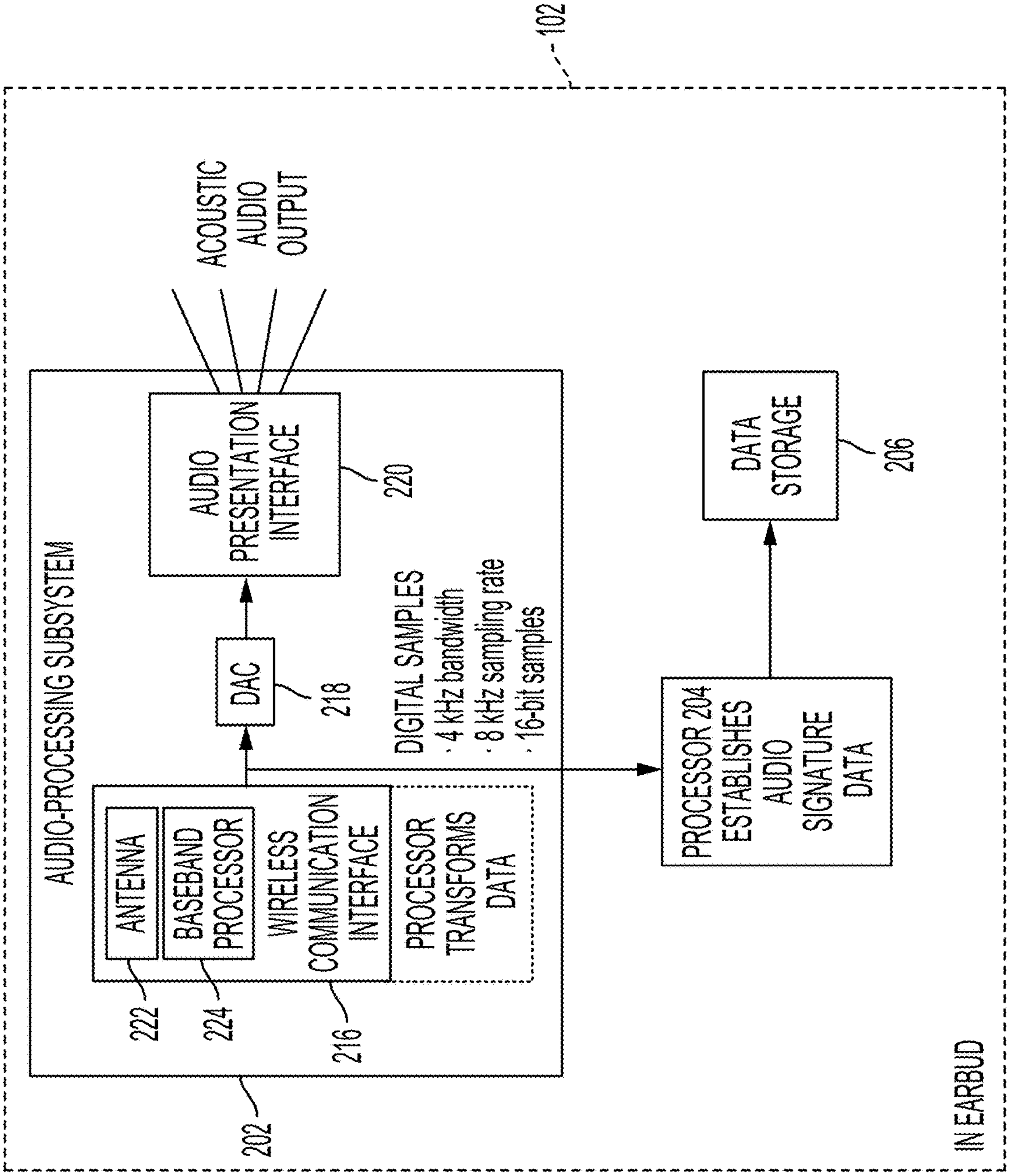
FIG. 6 is another simplified illustration of an arrangement for processing to establish audio signature data representing audio played out by an earbud.

FIG. 5 shows an alternative example arrangement in which the earbud 102 processes the output of its DAC 218 to establish the audio signature data for later reporting. In particular, in the arrangement of FIG. 5, in parallel with the audio-processing subsystem 202 processing and playing out the audio, a copy of the analog audio signal output from the DAC 218 gets fed through an active bandpass filter to reduce the audio frequency bandwidth of the audio. Then the audio signal with the reduced bandwidth gets fed through an analog-to-digital converter (ADC) that outputs digital samples at a rate and size reduced from the originally received digital samples, such as but not limited to 16-bit samples at an 8 kHz sampling rate for instance. The processor 204 of the earbud 102 then operates on this resulting sequence of digital samples to establish the audio signature data as noted above, and stores metering data, including this audio signature data possibly along with associated timestamp and sensor data, in data storage 206 for later reporting.

FIG. 6 next shows an alternative example arrangement in which the audio-processing subsystem 202 of the earbud 102 itself transforms the digital audio samples, providing transformed digital audio samples for both (i) use to facilitate playout of the audio and (ii) use to facilitate establishing the audio signature data for later reporting. In particular, in the arrangement of FIG. 6, the baseband processor 224 of the audio-processing subsystem 202, or a supplemental processor, transforms the received digital samples, applying a bandpass filter, reducing sample size, and reducing sample rate as discussed above for instance. The processor 204 of the earbud 102 then likewise operates on this resulting sequence of digital samples to establish the audio signature data as noted above, and stores metering data, including this audio signature data possibly along with associated timestamp and sensor data, in data storage 206 for later reporting.

In the example arrangements of FIGS. 4-6, once the earbud 102 gets connected with the charging case 104, the earbud 102 and/or charging case 104 may then report the metering data to the computing system 112. For instance, upon connection of the earbud 102 with the charging case 104, the processor 204 of the earbud 102 may send the metering data to the charging case 104 through the coupled charging/data interfaces 208, 308, and the processor 304 of the charging case 104 may then report the metering data via the wireless communication interface 302 to the computing system 112. Alternatively, upon connection of the earbud 102 with the charging case 104, the processor 304 of the charging case 104 may retrieve the stored metering data from the data storage 206 of the earbud 102 and may report the metering data via the wireless communication interface 302 to the computing system. Still alternatively, upon connection of the earbud 102 with the charging case 104, the processor 204 of the earbud may use the earbud's wireless communication interface 216 or the charging case's wireless communication interface 302 to transmit the metering data to the computing system 112. Other examples may be possible as well.

Note also that, in the example arrangements of FIGS. 4-6, the processor 204 may wait until the earbud 102 is connected with the charging case 104 and is charging, before the processor 204 establishes the audio signature data based on the digital samples. For instance, the processor 204 could store the transformed digital samples in data storage 206 and, upon coupling of the earbud 102 with the charging case 104, the processor 204 could then process the stored digital samples to establish the audio signature data and could then store the audio signature data in data storage 206.

Figure 7:
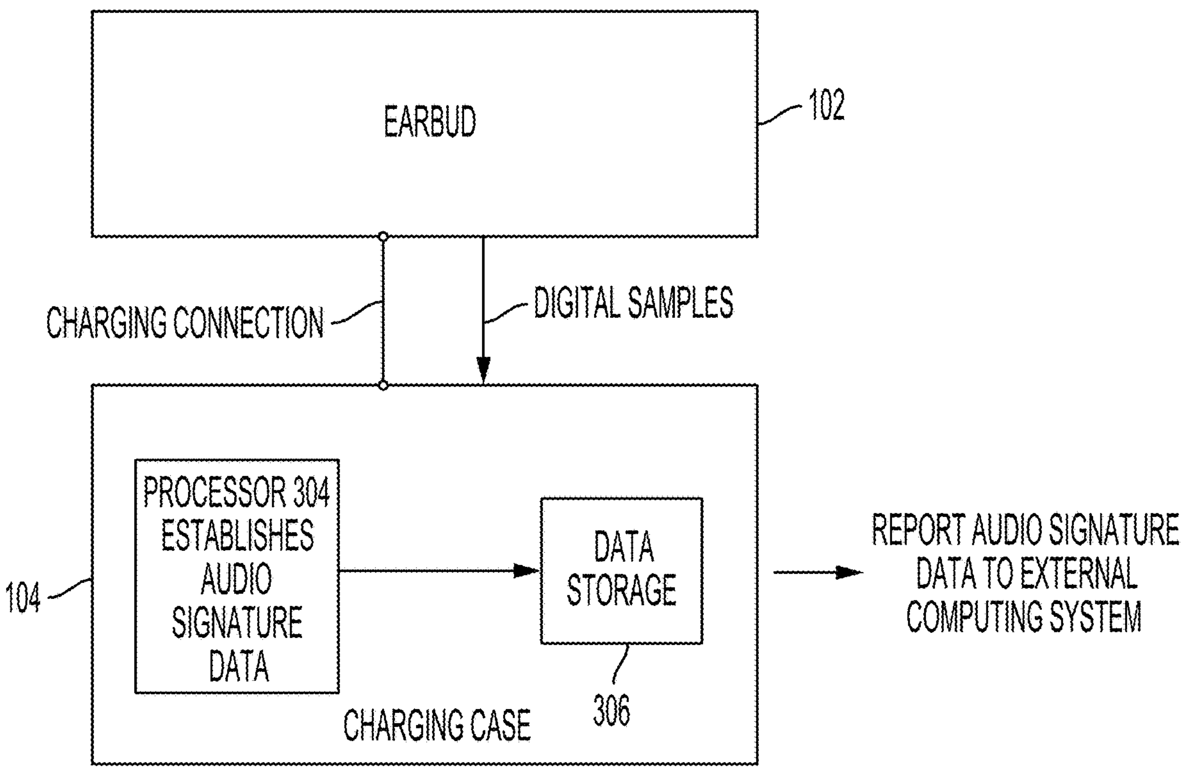
FIG. 7 is another simplified illustration of an arrangement for processing audio data to establish audio signature data representing audio played out by an earbud.

FIG. 7 next shows an example arrangement in which the charging case 104 establishes the audio signature data based on stored digital samples representing the audio that the earbud 102 played out while in use. In particular, the arrangement of FIG. 7 assumes that the earbud 102 has recorded in its data storage a sequence of digital samples representing the audio that the earbud played out while worn by the user 106. As shown in FIG. 7, when the earbud 102 is situated in the charging case 104 and is charging, the digital samples stored by the earbud 102 get transferred, along with timestamp and sensor data for instance, through the charging/data interfaces 208, 308 to the charging case 104 and get stored in the data storage 306 of the charging case 104. The processor 304 of the charging case 104 then operates on those digital samples to establish the audio signature data and may report metering data, including the audio signature data and possibly timestamp and sensor data, via the wireless communication interface 302 to the computing system 112.

In these or other embodiments, the earbud 102 and/or charging case 104 could be configured to detect when they are connected with each other, e.g., when the earbud 102 is placed within the charging case 104 to facilitate charging and/or storage, to facilitate responsive transferring of data between the earbud 102 and the charging case and reporting of the audio signature data to the computing system 112.

For instance, when the charging/data interface 208 of the earbud 102 is connected with the charging/data interface 308 of the charging case 104, a charge (energy) flow and/or data flow between the earbud 102 and the charging case 104 may result in interrupt signaling that alerts the processor 204 of the earbud and/or the processor 304 of the charging case 104, indicating that the earbud 102 is connected with the charging case 104. In response to this interrupt signaling, the earbud 102 and/or charging case 104 may then commence the process of transferring data, such as transferring audio signature data to the charging case 104 for reporting, and/or transferring digital audio samples from the earbud to the charging case to facilitate establishing of audio signature data for reporting. Further, in response to detecting this connection, the earbud 102 and/or charging case 104 may then report the established audio signature data to the computing system 112.

Further, as discussed above, in these or other embodiments, the sensor data established by one or more sensors 210 of the earbud 102 could be used to control or enhance this process in various ways. By way of example, as the sensor data may indicate operational state of the earbud 102 such as when the earbud 102 is worn and thus when the user 106 was likely exposed to audio played out by the earbud 102, the earbud 102 and/or charging case 104 may use that indicated operational state data as a basis to control establishing and/or reporting of the audio signature data.

For instance, given the indicated operational state data in time correlation with digital audio samples representing audio played out by the earbud 102, the earbud 102 and/or charging case 104 may limit establishing of timestamped audio signature data to just the digital audio samples representing audio played out by the earbud 102 at times when the earbud 102 was worn by the user 106. Likewise, given the indicated operational state data in time correlation with audio signature data representing audio played out by the earbud 102, the earbud 102 and/or charging case 104 may limit reporting to the computing system 112 to be just the timestamped audio signature data representing audio played out by the earbud at times when the earbud 102 was worn by the user 106.

Accordingly, in line with the discussion above, an example meter system could include (a) a WPLD configured (i) to be worn by a person, (ii) to wirelessly receive an audio stream defining audio, and (iii) to play out audio of the received audio stream in real time to one or both ears of the person, (b) a charging device configured to be coupled with the WPLD when the WPLD is not worn, and configured to deliver energy to the WPLD to charge an energy supply of the WPLD, and (b) a processor in the WPLD or charging device, configured to establish audio signature data representing the audio played out by the WPLD, wherein the meter system is configured to respond to coupling of the WPLD with the charging device by at least reporting the established audio signature data to an external computing system for use to facilitate measuring media exposure.

As discussed above, the processor that is configured to establish the audio signature data could be in the WPLD, in which case the processor may be configured to record in data storage of the WPLD the established audio signature data, and the meter system could be configured to respond to coupling of the WPLD with the charging device by at least transferring the recorded audio signature data from the WPLD to the charging device and reporting the transferred audio signature data to the external computing system.

Alternatively, the processor that is configured to establish the audio signature data could be in the charging device, in which case the WPLD may be configured to store digital samples of the audio played out by the WPLD, and the meter system may be configured to respond to coupling of the WPLD with the charging device by at least transferring the stored digital samples from the WPLD to the charging device, establishing the audio signature data based on the transferred digital samples, and reporting the established audio signature data to the external computing system.

Further, as discussed above, the received audio stream could be a digital audio stream having a first sampling rate, and the meter system could be configured to down-sample the digital audio stream, and the establishing of the audio signature data could involve establishing the audio signature data based on the down-sampled audio stream.

In addition, as discussed above, the received audio stream could be a digital audio stream having a first frequency bandwidth, the meter system could be configured to filter the digital audio stream to reduce a frequency bandwidth of the digital audio stream, and the establishing of the audio signature data could involve establishing the audio signature data based on the filtered digital audio stream.

Further, as discussed above, the received audio stream could be a digital audio stream having samples of a first bit length, the meter system could be configured to strip one or more least significant bits from the samples to reduce a bit length of the samples to a second bit length, and the establishing of the audio signature data could involve establishing the audio signature data based on the samples with the second bit length.

Still further, as discussed above, the received audio stream could be a digital audio stream having one or more watermarks associated with the digital audio stream (e.g., having one or more watermarks encoding identifying information of the audio stream), and the establishing of the audio signature data could involve extracting the audio signature data from the one or more watermarks associated with the digital audio stream. Alternatively or additionally, as discussed above, the establishing of the audio signature data could involve generating digital fingerprint data representing the audio stream.

In addition, as discussed above, the WPLD could include at least one sensor configured to provide sensor data indicating operational state of the WPLD. The establishing of the audio signature data could be further based on the operational state indicated by the sensor data, such as by being limited to establishing audio signature data just as to audio played out when the operational state data indicates that the WPLD is or was likely worn by a user. Likewise, the reporting of the of the audio signature data to the computing system could be further based on the operational state indicated by the sensor data, such as by being limited to reporting audio signature data just as to audio played out when the operational state data indicates that the WPLD is or was likely worn by a user.

As further discussed above, the audio signature data that gets established and/or reported could comprise or otherwise be accompanied by or associated with timestamps mapping to respective portions of the received audio stream. Those timestamps may be embedded and extracted from the audio signatures and/or created to denote when the user is exposed to the audio received by the WPLD, among other possibilities.

Figure 8:
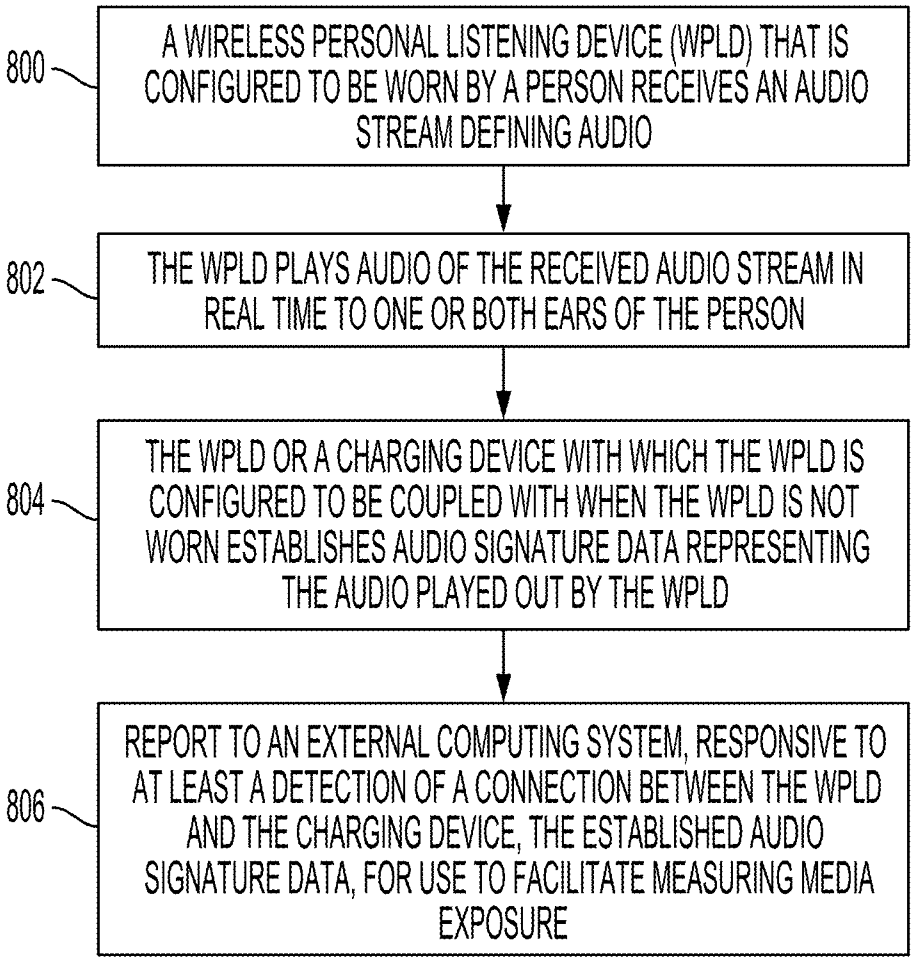
FIG. 8 is a flow chart illustrating a method for metering audio exposure from a WPLD, in accordance with example embodiments.

FIG. 8 is next a flow chart illustrating a metering method that can be carried out in accordance with the present disclosure. As shown in FIG. 8, at block 800, the method receiving, by a WPLD configured to be worn by a person, an audio stream defining audio. Further, at block 802, the example method includes playing, by the WPLD, audio of the received audio stream in real time to one or both ears of the person. Still further, at block 804, the method includes establishing, by the WPLD or by a charging device with which the WPLD is configured to be coupled with when the WPLD is not worn, audio signature data representing the audio played out by the WPLD. And still further, at block 806, the method includes reporting to an external computing system, responsive to at least a detection of a connection between the WPLD and the charging device, the established audio signature data for use to facilitate measuring media exposure.

In line with the discussion above, the establishing of the audio signature data could involve extracting the audio signature data from one or more watermarks encoded in the audio stream. Alternatively or additionally, the establishing of the audio signature data could involve generating digital fingerprint data representing the audio stream.

As further discussed above, the example method may also involve the WPLD or the charging device transforming a data representation of the audio stream before establishing the audio signature data. For instance, the method may involve down-sampling the audio stream to produce a down-sampled audio stream, so that the act of establishing the audio signature data could involve establishing the audio signature data based on the down-sampled audio stream. Further, the method may involve filtering the audio stream to reduce a frequency bandwidth of the audio stream, so that the establishing of the audio signature data could involve establishing the audio signature data based on the audio stream with the filtered bandwidth. Still further, in a scenario where establishing the audio signature data involves establishing the audio signature data based on digital samples of the audio, the method may involve stripping one or more least significant bits from each of the digital samples to reduce a bit length of the samples before the audio signature data is established, so that establishing the audio signature data could involve establishing the audio signature data based on the samples with the reduced bit length.

In addition, as discussed above, the example method could involve one or more sensors of the WPLD measuring an operational state of the WPLD, and the establishing and/or reporting of the audio signature data could be additionally based on the measured operational state.

The present disclosure also contemplates at least one non-transitory computer-readable medium that is encoded with, stores, or otherwise embodies program instructions executable by a processor to carry out various operations as described above.

Exemplary embodiments have been described above. Those skilled in the art will understand, however, that changes and modifications may be made to these embodiments without departing from the true scope and spirit of the invention.

What is claimed is:

1. A meter system comprising:

a wireless personal listening device (WPLD) configured (i) to be worn by a person, (ii) to wirelessly receive an audio stream defining audio, and (iii) to play out audio of the received audio stream in real time to one or both ears of the person;

a charging device configured to be coupled with the WPLD when the WPLD is not worn, and configured to deliver energy to the WPLD to charge an energy supply of the WPLD; and a processor in the WPLD or charging device, configured to establish audio signature data representing the audio played out by the WPLD, wherein the meter system is configured to respond to coupling of the WPLD with the charging device by at least reporting the established audio signature data to an external computing system for use to facilitate measuring media exposure.

2. The meter system of claim 1, wherein the processor that is configured to establish the audio signature data is in the WPLD, wherein the processor is configured to record in data storage of the WPLD the established audio signature data, and wherein the meter system is configured to respond to coupling of the WPLD with the charging device by at least transferring the recorded audio signature data from the WPLD to the charging device and reporting the transferred audio signature data to the external computing system.

3. The meter system of claim 1, wherein the processor that is configured to establish the audio signature data is in the charging device, wherein the WPLD is configured to store digital samples of the audio played out by the WPLD, and wherein the meter system is configured to respond to coupling of the WPLD with the charging device by at least transferring the stored digital samples from the WPLD to the charging device, establishing the audio signature data based on the transferred stored digital samples, and reporting the established audio signature data to the external computing system.

4. The meter system of claim 1, wherein the received audio stream is a digital audio stream having a first sampling rate, wherein the meter system is configured to down-sample the digital audio stream, and wherein establishing the audio signature data comprises establishing the audio signature data based on the down-sampled digital audio stream.

5. The meter system of claim 4, wherein the received audio stream is a digital audio stream having a first frequency bandwidth, wherein the meter system is configured to filter the digital audio stream to reduce a frequency bandwidth of the digital audio stream, and wherein establishing the audio signature data comprises establishing the audio signature data based on the filtered digital audio stream.

6. The meter system of claim 1, wherein the received audio stream is a digital audio stream having samples of a first bit length, and wherein the meter system is configured to strip one or more least significant bits from the samples to reduce a bit length of the samples to a second bit length, and wherein establishing the audio signature data comprises establishing the audio signature data based on the samples with the second bit length.

7. The meter system of claim 1, wherein the received audio stream is a digital audio stream having one or more watermarks associated with the digital audio stream, and wherein establishing the audio signature data comprises extracting the audio signature data from the one or more watermarks associated with the digital audio stream.

8. The meter system of claim 1, wherein establishing the audio signature data comprises generating digital fingerprint data representing the audio stream.

9. The meter system of claim 1, wherein the WPLD includes at least one sensor configured to provide sensor data indicating operational state of the WPLD, and wherein establishing the audio signature data is further based on the operational state indicated by the sensor data.

10. The meter system of claim 1, wherein the WPLD includes at least one sensor configured to provide sensor data indicating operational state of the WPLD, and wherein the reporting of the established audio signature data to the external computing system is based on the operational state indicated by the sensor data.

11. The meter system of claim 1, wherein the audio signature data comprises timestamps mapping to respective portions of the received audio stream.

12. A meter system comprising:

a wireless personal listening device (WPLD) configured (i) to be worn by a person, (ii) to wirelessly receive an audio stream defining audio, and (iii) to play out audio of the received audio stream in real time to one or both ears of the person;

a charging device configured to be coupled with the WPLD when the WPLD is not worn, and configured to deliver energy to the WPLD to charge an energy supply of the WPLD; and a processor in the WPLD or charging device, configured to establish audio signature data representing the audio played out by the WPLD, wherein the meter system is configured to respond to coupling of the WPLD with the charging device by at least reporting the established audio signature data to an external computing system for use to facilitate measuring media exposure, wherein the received audio stream is a digital audio stream, and wherein the meter system is configured to transform the digital audio stream including filtering a frequency bandwidth of the digital audio stream, down-sampling the digital audio stream, and reducing a bit-length of samples of the digital audio stream, wherein establishing the audio signature data is based on the transformed digital audio stream.

13. A method to facilitate measuring media exposure, the method comprising:

wirelessly receiving, by a wireless personal listening device (WPLD) configured to be worn by a person, an audio stream defining audio;

playing, by the WPLD, audio of the received audio stream in real time to one or both ears of the person;

establishing, by the WPLD or by a charging device with which the WPLD is configured to be coupled when the WPLD is not worn, audio signature data representing the audio played out by the WPLD; and reporting to an external computing system, responsive to at least a detection of a connection between the WPLD and the charging device, the established audio signature data for use to facilitate measuring media exposure.

14. The method of claim 13, wherein establishing the audio signature data comprises extracting the audio signature data from one or more watermarks in the audio stream.

15. The method of claim 13, wherein establishing the audio signature data comprises generating digital fingerprint data representing the audio stream.

16. The method of claim 13, further comprising, before establishing the audio signature data, down-sampling the audio stream to produce a down-sampled audio stream, wherein establishing the audio signature data comprises establishing the audio signature data based on the down-sampled audio stream.

17. The method of claim 13, further comprising:

filtering the audio stream to reduce a frequency bandwidth of the audio stream, wherein establishing the audio signature data comprises establishing the audio signature data based on the audio stream with a filtered bandwidth.

18. The method of claim 13, wherein establishing the audio signature data comprises establishing the audio signature data based on digital samples of the audio, the method further comprising:

stripping one or more least significant bits from each of the digital samples to reduce a bit length of the digital samples before the audio signature data is established, wherein establishing the audio signature data comprises establishing the audio signature data based on the digital samples with the reduced bit length.

19. The method of claim 13, further comprising measuring, by a sensor of the WPLD, operational state of the WPLD, wherein the establishing of the audio signature data is further based on the measured operational state.

20. The method of claim 13, further comprising measuring, by a sensor of the WPLD, operational state of the WPLD, wherein the reporting of the audio signature data to the external computing system is further based on the measured operational state.

* * * * *